US010563871B2

(12) United States Patent
Jeong et al.

(10) Patent No.: US 10,563,871 B2
(45) Date of Patent: Feb. 18, 2020

(54) COOKING APPLIANCE

(71) Applicant: SAMSUNG ELECTRONICS CO., LTD., Suwon-si, Gyeonggi-do (KR)

(72) Inventors: Ji Ho Jeong, Hwaseong-si (KR); Hyung-Jin Kim, Suwon-si (KR); Han Seong Kang, Hwaseong-si (KR); Yeong Hyeok Kim, Seoul (KR); Duck Jin Sung, Suwon-si (KR); Hyun Ju Lee, Suwon-si (KR); Pung Yeun Cho, Suwon-si (KR); Soo Hyoung Heo, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 15/963,798

(22) Filed: Apr. 26, 2018

(65) Prior Publication Data

US 2018/0313545 A1    Nov. 1, 2018

(30) Foreign Application Priority Data

Apr. 28, 2017 (KR) .......................... 10-2017-0055713

(51) Int. Cl.
*F24C 15/16* (2006.01)
*F16F 1/36* (2006.01)

(52) U.S. Cl.
CPC ............ *F24C 15/16* (2013.01); *F16F 1/3605* (2013.01); *F16F 2224/02* (2013.01); *F16F 2226/04* (2013.01); *F16F 2234/06* (2013.01)

(58) Field of Classification Search
CPC ....... F24C 15/16; F24C 15/168; F16F 1/3605; F16F 2224/02; F16F 2226/04; F16F 2234/06

USPC ............. 312/334.8, 334.11, 334.32, 334.34, 312/334.44, 334.13
See application file for complete search history.

(56) References Cited

U.S. PATENT DOCUMENTS

| 1,231,291 | A | * | 6/1917 | Otte ............................. 16/94 R |
| 2,277,703 | A | * | 3/1942 | Kennedy ................ A47B 88/49 312/334.8 |

(Continued)

FOREIGN PATENT DOCUMENTS

| KR | 2003-0059919 | 7/2003 |
| KR | 10-2011-0045970 | 5/2011 |
| KR | 10-2016-0000661 | 1/2016 |

OTHER PUBLICATIONS

PCT International Search Report issued in PCT International Application No. PCT/KR2018/004794 dated Sep. 27, 2018 (3 pages total).

*Primary Examiner* — Hanh V Tran (74) *Attorney, Agent, or Firm* — Staas & Halsey LLP (57) ABSTRACT

A cooking appliance including a cooking room; and a rack assembly removably installed in the inside of the cooking room. The rack assembly includes a stationary member fixed in the inside of the cooking room; a moving member configured to slide out of the cooking room; a locking device installed in the stationary member, and configured to lock the stationary member to prevent the stationary member from escaping from the inside of the cooking room; and a noise reducing member configured to reduce noise that is generated when the locking device contacts with at least one of the stationary member and the moving member.

17 Claims, 10 Drawing Sheets

(56) References Cited

U.S. PATENT DOCUMENTS

| | | | | | |
|---|---|---|---|---|---|
| 3,033,638 | A | * | 5/1962 | Tomlinson | A47B 88/49 312/334.8 |
| 3,649,090 | A | * | 3/1972 | Dutot | A47B 88/497 384/23 |
| 4,072,375 | A | * | 2/1978 | Boone | A47B 88/49 312/334.8 |
| 4,384,746 | A | * | 5/1983 | Ferdinand | A47B 88/493 312/334.7 |
| 4,440,461 | A | * | 4/1984 | Powell | A47B 88/417 312/334.8 |
| 5,181,781 | A | * | 1/1993 | Wojcik | A47B 88/40 384/21 |
| 5,868,479 | A | * | 2/1999 | Hoffman | A47B 88/493 312/334.44 |
| 5,876,103 | A | * | 3/1999 | Domenig | A47B 88/487 312/334.4 |
| 6,350,001 | B1 | * | 2/2002 | Chu | A47B 88/493 312/334.11 |
| 6,382,751 | B1 | * | 5/2002 | Chiu | A47B 88/477 312/334.11 |
| 6,789,862 | B2 | * | 9/2004 | Shih-Long | A47B 88/49 312/334.46 |
| 7,216,646 | B2 | * | 5/2007 | Le | F24C 15/16 126/273 R |
| 7,347,516 | B2 | * | 3/2008 | Hay | A47B 88/40 312/333 |
| 2004/0069299 | A1 | * | 4/2004 | Le | F24C 15/16 126/337 R |
| 2004/0112371 | A1 | * | 6/2004 | Le | F24C 15/16 126/334 |
| 2005/0074190 | A1 | * | 4/2005 | Traiser | A47B 88/483 384/21 |
| 2005/0204933 | A1 | | 9/2005 | Freese et al. | |
| 2006/0186773 | A1 | * | 8/2006 | Lam | A47B 88/493 312/334.8 |
| 2007/0284976 | A1 | * | 12/2007 | Huang | E05B 65/464 312/220 |
| 2008/0184987 | A1 | | 8/2008 | Haberkamm et al. | |
| 2010/0019637 | A1 | * | 1/2010 | Guttinger | F24C 15/168 312/334.5 |
| 2010/0218755 | A1 | * | 9/2010 | Stewart | F24C 15/168 126/339 |
| 2010/0300136 | A1 | * | 12/2010 | Kempte | A47B 88/43 62/344 |
| 2011/0132348 | A1 | * | 6/2011 | Smith | F24C 15/16 126/339 |
| 2012/0017885 | A1 | * | 1/2012 | Stewart | F24C 15/168 126/339 |
| 2013/0118471 | A1 | * | 5/2013 | Sprigler | F24C 15/168 126/19 R |
| 2014/0026882 | A1 | * | 1/2014 | Ambrose | F24C 15/16 126/339 |
| 2014/0231421 | A1 | * | 8/2014 | Yang | F24C 15/168 219/763 |
| 2015/0101590 | A1 | * | 4/2015 | Armstrong | F24C 15/162 126/340 |
| 2015/0184868 | A1 | * | 7/2015 | Sharbidre | F24C 15/16 126/339 |
| 2016/0150668 | A1 | * | 5/2016 | Cheng | H05K 7/1489 361/679.02 |
| 2016/0165740 | A1 | * | 6/2016 | Song | H05K 7/1489 312/334.46 |

\* cited by examiner

COOKING APPLIANCE

CROSS-REFERENCE TO RELATED APPLICATION

This application is based on and claims priority under 35 U.S.C. § 119 to Korean Patent Application No. 10-2017-0055713, filed on Apr. 28, 2017, in the Korean Intellectual Property Office, the disclosure of which is incorporated by reference herein in its entirety.

BACKGROUND

1. Field

The present disclosure relates to a cooking appliance having a structure capable of reducing noise generated from a rack removably installed in the inside of a cooking room.

2. Description of the Related Art

A cooking appliance is an appliance for cooking food. An example of the cooking appliance is an oven.

The oven is an appliance for cooking food by sealing the cooking room and then heating the food. The oven can be generally classified into an electric type, a gas type, and an electronic type according to its heat source. The electric type oven and the gas type oven use an electric heater and a gas heater respectively as heat sources, and the electronic oven also called a microwave oven uses friction heat of water molecules caused by high-frequency waves, as a heat source.

Generally, the oven includes a cooking room, a heating apparatus for applying heat to the cooking room, and a circulation apparatus for circulating heat generated by the heating apparatus in the inside of the cooking room. Also, the oven includes a door for enabling a user to open or close the cooking room, and a rack for supporting food or a container with food in the inside space of the cooking room.

SUMMARY

Therefore, it is an aspect of the present disclosure to provide a cooking appliance including a noise reducing member capable of reducing noise generated from a rack assembly for supporting food or a container with food in the inside space of a cooking room.

It is another aspect of the present disclosure to provide a cooking appliance including a buffer member for cushioning an impact generated by a sliding device of a rack assembly.

Additional aspects of the disclosure will be set forth in part in the description which follows and, in part, will be obvious from the description, or may be learned by practice of the disclosure.

In accordance with an aspect of the present disclosure, a cooking appliance includes a cooking room; and a rack assembly removably installed in an inside of the cooking room. The rack assembly includes a stationary member fixed in the inside of the cooking room; a moving member configured to slide in and out of the cooking room with respect to the stationary member; a locking device installed in the stationary member, and configured to lock the stationary member to prevent the stationary member from escaping from the inside of the cooking room; and a noise reducing member configured to reduce noise that is generated when the locking device contacts with at least one of the stationary member and the moving member.

The moving member may be configured to slide between a close position at which the moving member is located in the inside of the cooking room and an open position at which at least one portion of the moving member protrudes out of the cooking room. The locking device may lock the stationary member when the moving member is at the open position, and unlocks the stationary member when the moving member is at the close position. The noise reducing member may reduce noise that is generated when the locking device contacts with at least one of the stationary member and the moving member during at least one process among a locking process of the locking device and an unlocking process of the locking device.

The noise reducing member may reduce noise that is generated between the locking device and the stationary member when the moving member moves from the close position to the open position.

The noise reducing member may reduce noise that is generated between the locking device and the moving member when the moving member moves from the open position to the close position.

The cooking appliance may further include a holder configured to prevent the stationary member from escaping from the cooking room when the locking device is in a locked state. The locking device may include a latch configured to be caught by the holder; and a lever configured to lift the latch. The noise reducing member may be disposed in the lever.

The stationary member may include a flange on which the lever is supported. The noise reducing member may reduce noise that is generated when the lever contacts with the flange.

The moving member may push up the lever when the moving member is at the close position. The noise reducing member may reduce noise that is generated when the moving member contacts with the lever.

The noise reducing member may include a resin material, and is injection-molded.

The noise reducing member may surround the lever.

The noise reducing member may include an extension to increase a contact area contacting the flange.

When the noise reducing member contacts the flange, the latch may do not contact the holder.

The rack assembly may further include a sliding device configured to connect the stationary member to the moving member. The sliding device may include an outer slide coupled with the stationary member; an inner slide coupled with the moving member; and a middle slide coupled with the outer slide and the inner slide, and configured to slide with respect to the outer slide and the inner slide. The middle slide may include a buffer member configured to reduce an impact caused by a contact with at least one of the outer slide and the inner slide.

The middle slide may have a length that is equal to or shorter than a length of the outer slide and a length of the inner slide. The buffer member may be disposed in at least one of both ends of the middle slide.

The middle slide may further include an outer member connected to the outer slide, and configured to slide with respect to the outer slide; and an inner member connected to the inner slide, and configured to slide with respect to the inner slide. The buffer member may include a plate spring supported between the outer member and the inner member.

The buffer member may include a first buffer member configured to reduce an impact caused by a contact with the outer slide, and a second buffer member configured to reduce an impact caused by a contact with the inner slide.

In accordance with an aspect of the present disclosure, a cooking appliance includes a cooking room; a rack assembly removably installed in an inside of the cooking room; a rail disposed on both side walls of the cooking room, and configured to support the rack assembly; and a holder configured to catch the rack assembly, thereby preventing the rack assembly from escaping from the cooking room. The rack assembly includes a stationary member fixed in the inside of the cooking room; a moving member configured to slide in and out of the cooking room with respect to the stationary member; a sliding device configured to connect the stationary member to the moving member. The sliding device includes an outer slide coupled with the stationary member; an inner slide coupled with the moving member; and a middle slide coupled with the outer slide and the inner slide, and configured to slide with respect to the outer slide and the inner slide. The middle slide includes a buffer member configured to reduce an impact caused by a contact with at least one of the outer slide and the inner slide.

The rack assembly may include a locking device installed in the stationary member, and configured to lock the stationary member to prevent the stationary member from escaping from the inside of the cooking room; and a noise reducing member configured to reduce noise that is generated when the locking device contacts with at least one of the stationary member and the moving member.

The locking device may include a body rotatably coupled with the stationary member; a latch extending from the body, and configured to be caught by the holder; a lever extending from the body, and configured to be pushed by the moving member to rotate the body; and an elastic member installed between the body and the stationary member, the elastic member having a restoring force toward a direction in which the latch is caught by the holder. The noise reducing member may be disposed in the lever.

The outer slide may include a first flange configured to prevent the middle slide from escaping, and the inner slide comprises a second flange configured to prevent the middle slide from escaping. The buffer member may include a plate spring disposed in at least one end of both ends of the middle slide, and configured to reduce an impact caused by a contact with at least one flange of the first flange and the second flange.

The middle slide may further include an outer member connected to the outer slide, and configured to slide with respect to the outer slide; and an inner member is connected to the inner slide, and configured to slide with respect to the inner slide. The plate spring may be supported between the outer member and the inner member.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

The terms used in the present specification are used to describe the embodiments of the present disclosure. Accordingly, it should be apparent to those skilled in the art that the following description of exemplary embodiments of the present disclosure is provided for illustration purpose only and not for the purpose of limiting the disclosure as defined by the appended claims and their equivalents. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

Also, it will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Hereinafter, the embodiments of the present disclosure will be described in detail with reference to the accompanying drawings. In the following description, the term "front" indicates a direction toward a door from a main body of a cooking appliance shown in FIG. 1.

Figure 1:
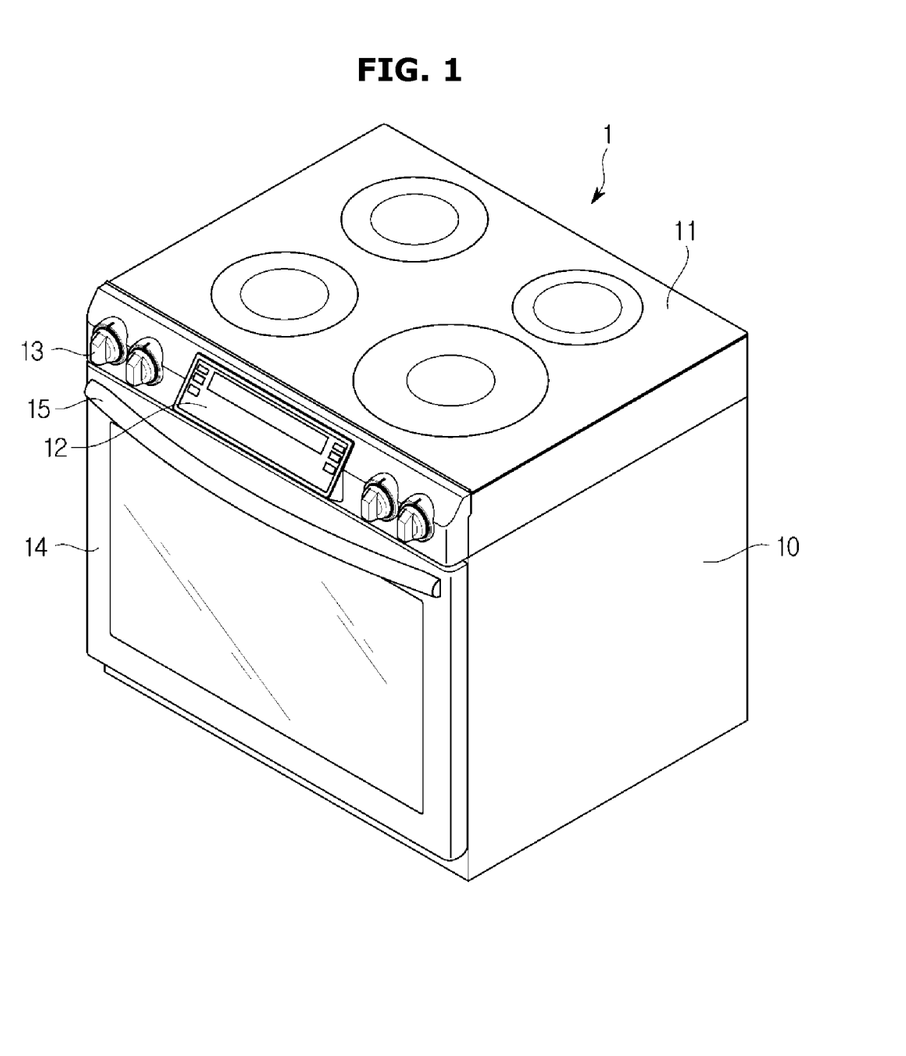
FIG. 1 shows a perspective view of a cooking appliance according to an embodiment of the present disclosure.
Figure 2:
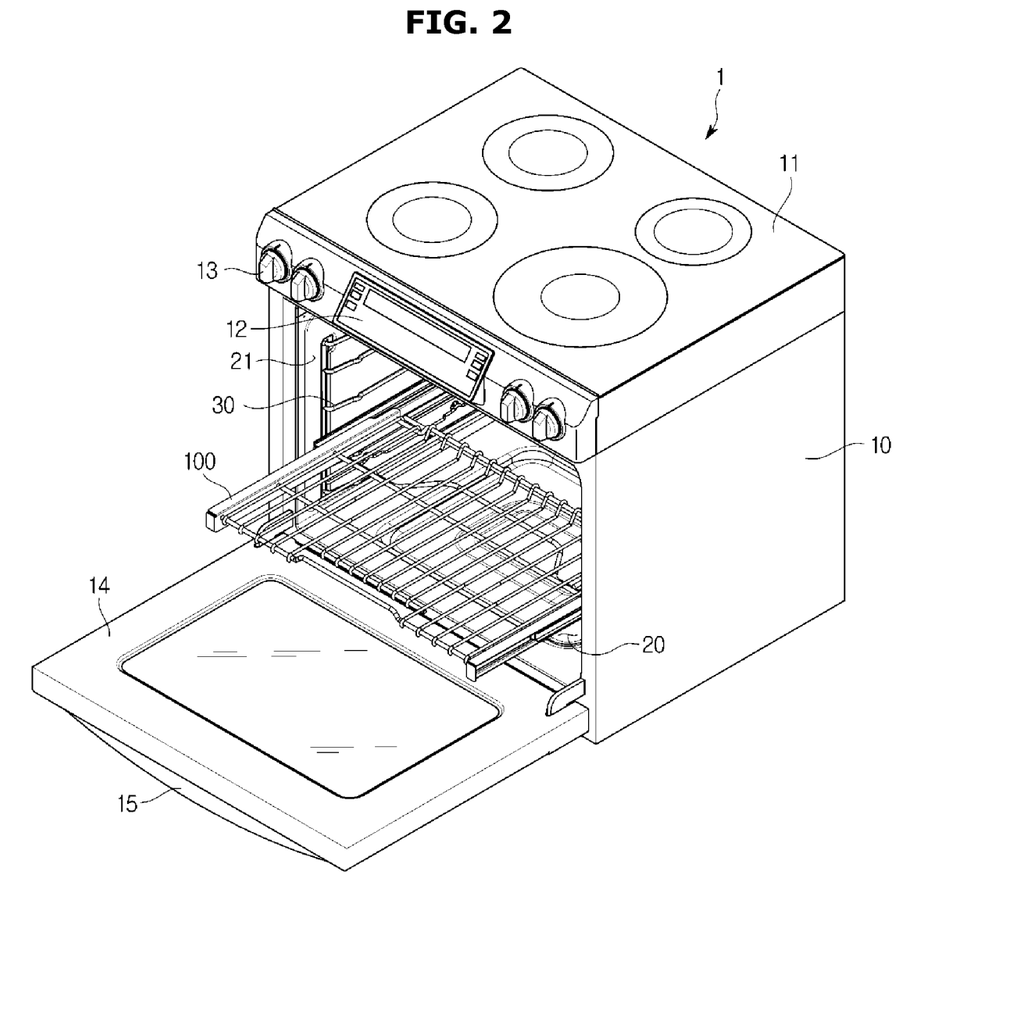
FIG. 2 shows a perspective view of a cooking appliance according to an embodiment of the present disclosure when a door opens.

FIG. 1 is a perspective view of a cooking appliance according to an embodiment of the present disclosure, and FIG. 2 is a perspective view of a cooking appliance according to an embodiment of the present disclosure when a door opens.

Referring to FIGS. 1 and 2, a cooking appliance 1 may include a main body 10 having a cooking room 20 therein. The cooking appliance 1 may include a cooktop 11 which is disposed on a top of the main body 10 and on which a container with food can be put and heated.

The cooking appliance 1 may include a control panel 12 for enabling a user to control the cooking appliance 1. The control panel 12 may include a display panel for displaying an operation state of the cooking appliance 1. The cooking appliance 1 may include a knob 13 for adjusting the cooktop 11. The control panel 12 and the knob 13 may be positioned on a front upper portion of the main body 10. Behind the control panel 12, a plurality of electronic components may be disposed.

The cooking room 20 may be formed in the shape of a box, and may open in the front portion to enable the user to put food in or take food out. The open front portion of the cooking room 20 may be opened or closed by a door 14. The door 14 may be hinge-coupled with the main body 10 at the lower end, and rotate to open or close the cooking room 20. A handle 15 of the door 14 may be disposed on a front upper portion of the door 14. Although not shown in FIGS. 1 and 2, the door 14 may be hinge-coupled with the main body 10 at the left or right end, and the handle 15 may be positioned at the left or right end of the door 14.

The cooking appliance 1 may include a rail 30 disposed on inner side walls of the cooking room 20. The cooking appliance 1 may include a plurality of rails 30 disposed at different heights on the inner side walls of the cooking room 20. The rails 30 may support a rack assembly 100 on which food or a container with food can be put. The rack assembly 100 may be removably installed in the inside of the cooking room 20.

Figure 3:
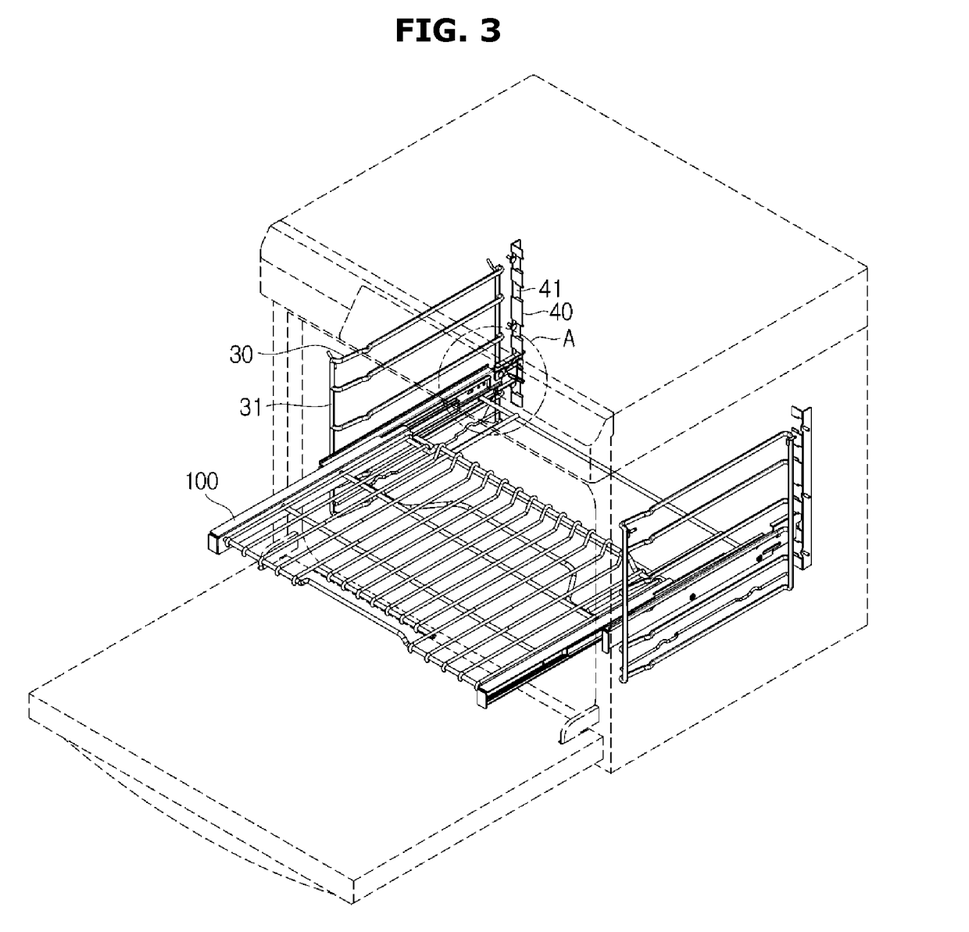
FIG. 3 shows a perspective view showing components installed in the inside of a cooking room of a cooking appliance according to an embodiment of the present disclosure.

FIG. 3 is a perspective view showing components installed in the inside of a cooking room of a cooking appliance according to an embodiment of the present disclosure.

Referring to FIGS. 2 and 3, the plurality of rails 30 disposed at different heights may extend horizontally on both side walls of the cooking room 20, while being supported by a plurality of rail supports 31 extending vertically. The rail supports 31 may be coupled with the side walls 21 of the cooking room 20.

The rack assembly 100 may be installed in the inside of the cooking room 20 by being supported on one of the plurality of rails 30. The cooking appliance 1 may include a holder 40 for holding the rack assembly 100 removably installed in the cooking room 20 to prevent the rack assembly 100 from escaping from the cooking room 20. The cooking appliance 1 may include a plurality of holders 40 installed at different heights. The plurality of holders 40 may be installed at heights corresponding to the installation heights of the plurality of rails 30.

The holders 40 may be disposed at rear areas of both the side walls of the cooking room 20. The plurality of holders 40 may extend horizontally from a holder support 41 extending vertically. The holder support 41 may be coupled with the side walls 21 of the cooking room 20 or with a rear wall of the cooking room 20.

Figure 4:
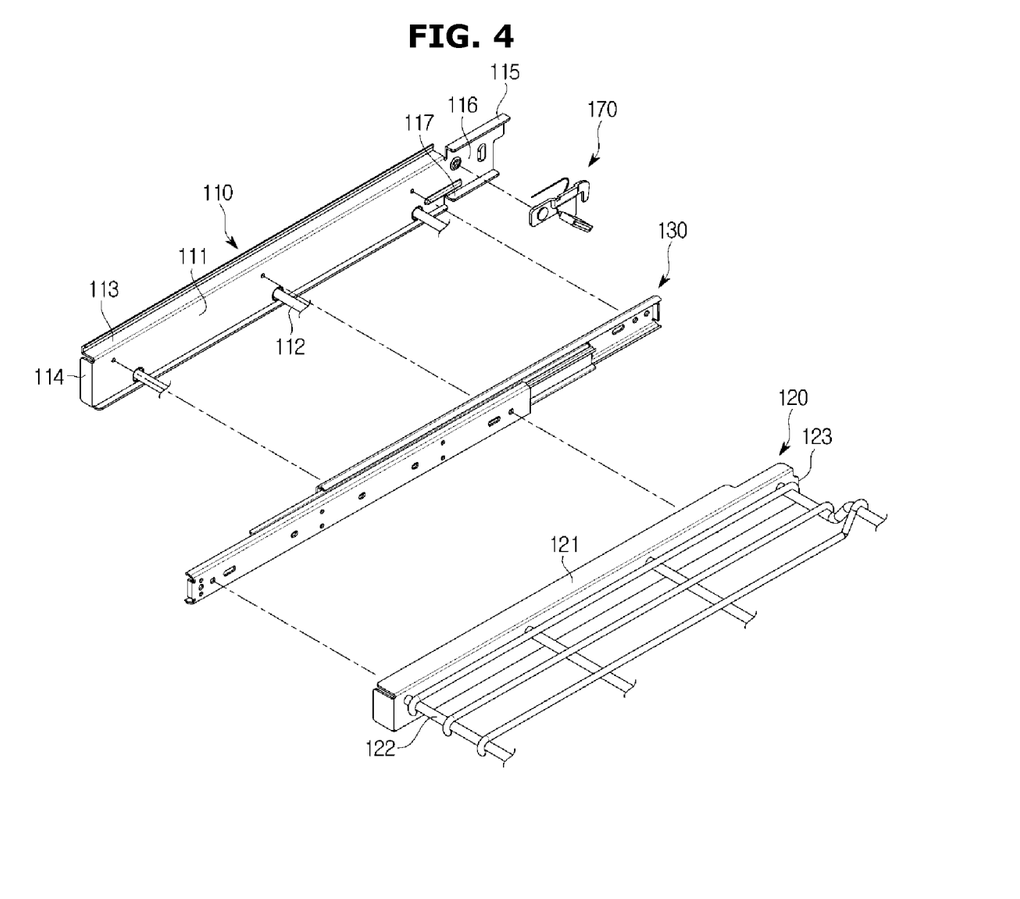
FIG. 4 shows an exploded perspective view showing a portion of a rack assembly shown in FIG. 3.

FIG. 4 is an exploded perspective view showing a portion of a rack assembly shown in FIG. 3.

Referring to FIGS. 3 and 4, the rack assembly 100 may include a stationary member 110, a moving member 120, a sliding device 130, and a locking device 170.

When the rack assembly 100 is installed in the inside of the cooking room 20, the stationary member 110 may be fixed in the inside of the cooking room 320. The locking device 170 may lock the stationary member 110 to prevent the stationary member 110 from escaping from the inside of the cooking room 20. The locking device 170 may be installed in the stationary member 110.

The stationary member 110 may include a stationary member bracket 111 and a stationary member frame 112. Two stationary member brackets 111 may be respectively supported on the rails 30 disposed on both the side walls of the cooking rook 20. The stationary member frame 112 may connect and support the two stationary member brackets 111.

Each stationary member bracket 111 may include a rail support flange 113 supported on the corresponding rail 30. The rail support flange 113 may be disposed on a top of the stationary member bracket 111. The stationary member bracket 111 may include a front flange 114 at the front end. The front flange 114 may be supported on a front end of the rail 20, in order to prevent the stationary member 110 from moving farther than a limited range toward a rear direction of the cooking room 20 when the rack assembly 100 is installed in the cooking room 20.

The locking device 170 may be installed in the stationary member bracket 111. The stationary member bracket 111 may include a web 116 with which the locking device 170 is rotatably coupled, a upper flange 115 extending from a upper end of the web 116, and a lower flange 117 extending from a lower end of the web 116.

When the rack assembly 100 is installed in the inside of the cooking room 20, the moving member 120 may slide out of the cooking room 20. The user can pull the moving member 120 out of the cooking room 20 to put food or a container with food on the moving member 120.

The sliding device 130 may connect the stationary member 110 to the moving member 120. The moving member 120 may slide with respect to the stationary member 110 by the sliding device 130.

The moving member 120 may include a moving member bracket 121 and a moving member frame 122. The moving member bracket 121 may be coupled with the stationary member bracket 111 by the sliding device 130. The rack assembly 100 may include two sliding devices 130 corresponding to the two stationary member brackets 111. The moving member 120 may include two moving member brackets 121 corresponding to the two stationary member brackets 111.

The moving member frame 122 may connect and support the two moving member brackets 121. The user can put food or a container with food on the moving member bracket 122.

Figure 5:
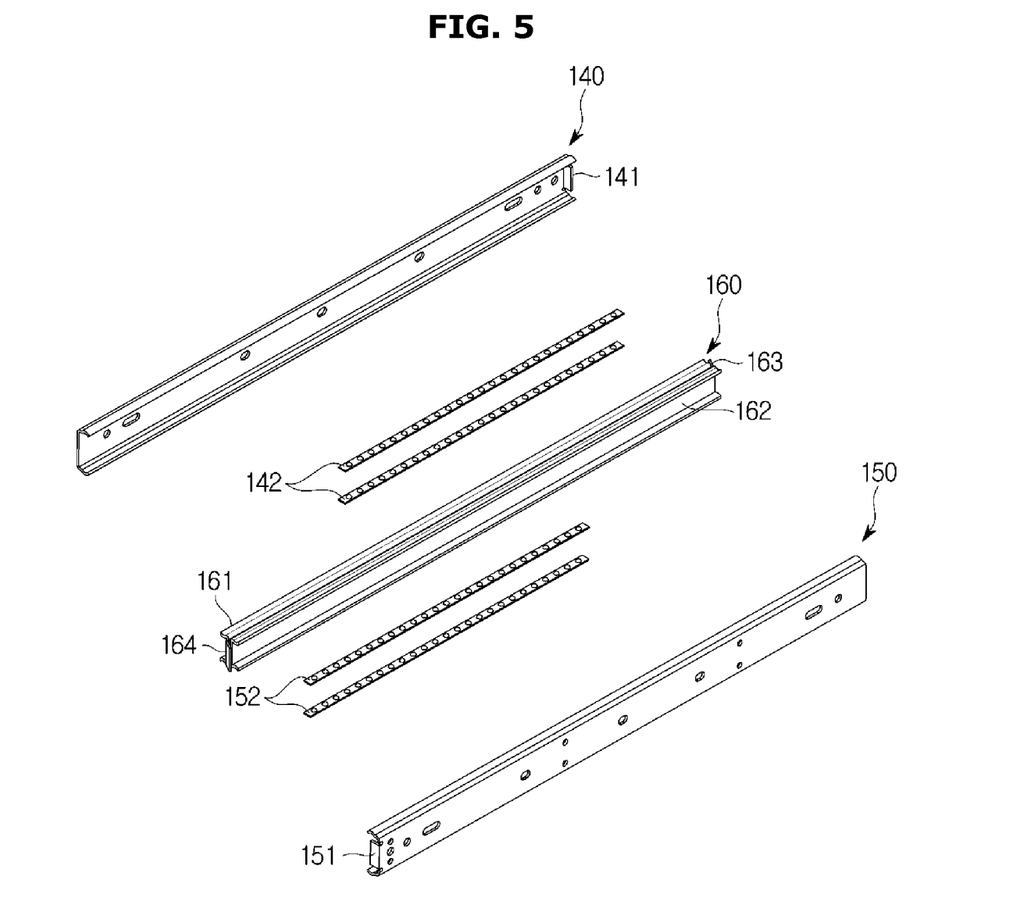
FIG. 5 shows an exploded perspective view of a sliding device shown in FIG. 4.

FIG. 5 is an exploded perspective view of a sliding device shown in FIG. 4.

Referring to FIGS. 4 and 5, the sliding device 130 may be coupled with the stationary member bracket 111 and the moving member bracket 121. The sliding device 130 may include an outer slide 140, an inner slide 150, and a middle slide 160.

The outer slide 140 may be coupled with the stationary member 110. The inner slide 150 may be coupled with the moving member 120. The outer slide 140 may be coupled with the stationary member bracket 111. The inner slide 150 may be coupled with the moving member bracket 121.

The middle slide 160 may connect the outer slide 140 to the inner slide 150. The middle slide 160 may include an outer member 161 and an inner member 162. The outer member 161 may be connected to the outer slide 140, and the inner member 162 may be connected to the inner slide 150.

The middle slide 160 may slide with respect to the outer slide 140 and the inner slide 150. The outer member 161 may slide with respect to the outer slide 140, and the inner member 162 may slide with respect to the inner slide 150.

Between the outer member 161 and the outer slide 140, a first bearing 142 may be disposed. Between the inner member 162 and the inner slide 150, a second bearing 152 may be disposed. The first bearing 142 and the second bearing 152 may include a metal ball and a retainer for supporting the metal ball.

The middle slide 160 may have a length that is equal to or shorter than the lengths of the outer slide 140 and the inner slide 150. The middle slide 160 may freely move between the outer slide 140 and the inner slide 150.

The outer slide 140 may include a first flange 141 configured to prevent the middle slide 160 from escaping in the rear direction. The inner slide 150 may include a second flange 151 configured to prevent the middle slide 160 from escaping in the front direction. The first flange 141 may be disposed at a rear end of the outer slide 140, and the second flange 151 may be disposed at a front end of the inner slide 150.

The middle slide 160 may include a buffer member 163 and 164 configured to cushion an impact caused by a collision with at least one of the outer slide 140 and the inner slide 150. The buffer member 163 and 164 may cushion the impact, and reduce noise generated by the impact.

The buffer member 163 and 164 may be disposed in at least one of both ends of the middle slide 160. The buffer member 163 and 164 may include a plate spring supported between the outer member 161 and the inner member 162.

The buffer member 163 and 164 may include at least one among a first buffer member 162 for cushioning an impact caused by a collision with the outer slide 140, and a second buffer member 164 for cushioning an impact caused by a collision with the inner slide 150.

The first buffer member 163 may cushion an impact caused by a collision of the middle slide 160 with the first flange 141 of the outer slide 140. The first buffer member 163 may be disposed at the rear end of the middle slide 160. The first buffer member 163 may include a plate spring supported between the outer member 161 and the inner member 162 and bent toward the outer member 161.

The second buffer member 164 may cushion an impact caused by a collision of the middle slide 160 with the second flange 151 of the inner slide 150. The second buffer member 164 may be disposed at the front end of the middle slide 160. The second buffer member 164 may include a plate spring supported between the outer member 161 and the inner member 162 and bent toward the inner member 162.

Figure 6:
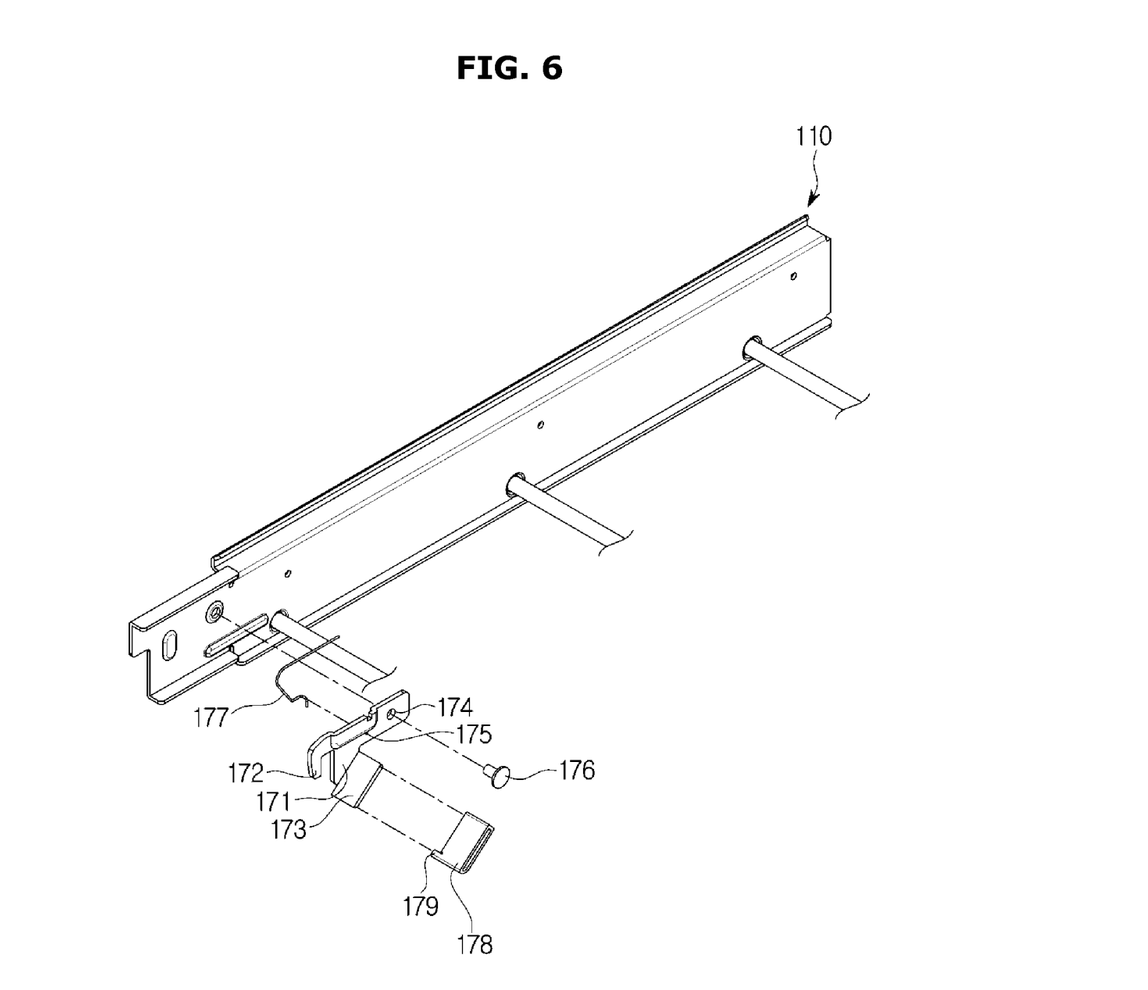
FIG. 6 shows an exploded perspective view of a locking device shown in FIG. 4.

FIG. 6 is an exploded perspective view of a locking device shown in FIG. 4.

Referring to FIGS. 4 and 6, the locking device 170 may include a body 171, a latch 172, a lever 173, an elastic member 177, and a noise reducing member 178. The body 171 may be rotatably coupled with the stationary member 110 by a coupling member 176. The body 171 may be rotatably coupled with the stationary member bracket 111 of the stationary member 110. The body 171 may include a coupling hole 174 which the coupling member 176 can penetrate.

The latch 172 may extend from the body 171. The latch 172 may be caught by the holders 40 (see FIG. 3). The latch 172 may be caught by the holders 40 by a rotation of the body 171. The lever 173 may extend from the body 171. The lever 173 may rotate the body 171. When the lever 173 is pushed by the moving member 120, the body 171 and the lever 172 may rotate. When the moving member 120 slides toward the inside of the cooking room 200, a rear end 123 of the moving member bracket 121 may push the lever 173.

In order to return the rotated body 171, the rotated latch 171, and the rotated lever 173 to their original positions, the elastic member 177 may be installed between the body 171 and the stationary member 110. The elastic member 177 may have a restoring force toward a direction in which the latch 172 is caught by the holder 40.

The elastic member 177 may be supported on the upper flange 115 of the stationary member bracket 111. One end of the elastic member 177 may be supported on a lower surface of the upper flange 115 of the stationary member bracket 11, and the other end of the elastic member 177 may be supported on an elastic member supporting groove 175 formed in the body 171. The elastic member 177 may include a spring.

The lever 173 may receive a force toward the lower flange 117 of the stationary member bracket 111 by the elastic member 177. The lever 173 may be supported on the lower flange 117 of the stationary member bracket 111.

When the moving member 120 pushes the lever 173 to lift the latch 172, the moving member 120 may collide or contact with the lever 173 to generate noise. When the moving member 120 reverses to push up the lever 173, and then moves forward, the lever 173 may collide or contact with the lower flange 117 of the stationary member bracket 111 to generate noise.

The noise reducing member 178 may reduce noise generated from the locking device 170. The noise reducing member 178 may be disposed in the lever 173. The noise reducing member 178 may surround the lever 173. The noise reducing member 178 may include a resin material. The noise reducing member 178 may be injection-molded.

The noise reducing member 178 may reduce noise generated when the lever 173 collides or contacts with the moving member 120. Also, the noise reducing member 178 may reduce noise generated when the lever 173 collides or contacts with the lower flange 117 of the stationary member bracket 111. The noise reducing member 178 may include an extension 179 for increasing a contact area contacting the lower flange 117.

Figure 7:
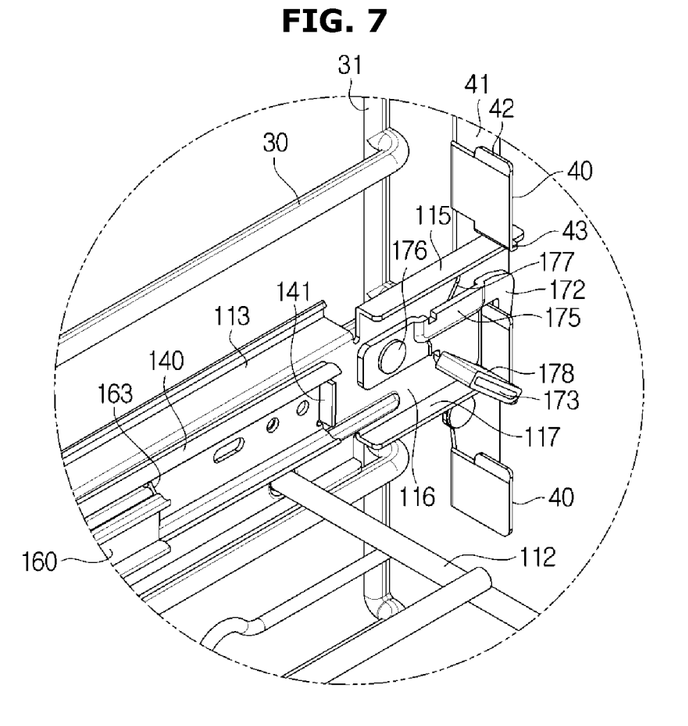
FIG. 7 shows an enlarged perspective view of an area A of FIG. 3.
Figure 8:
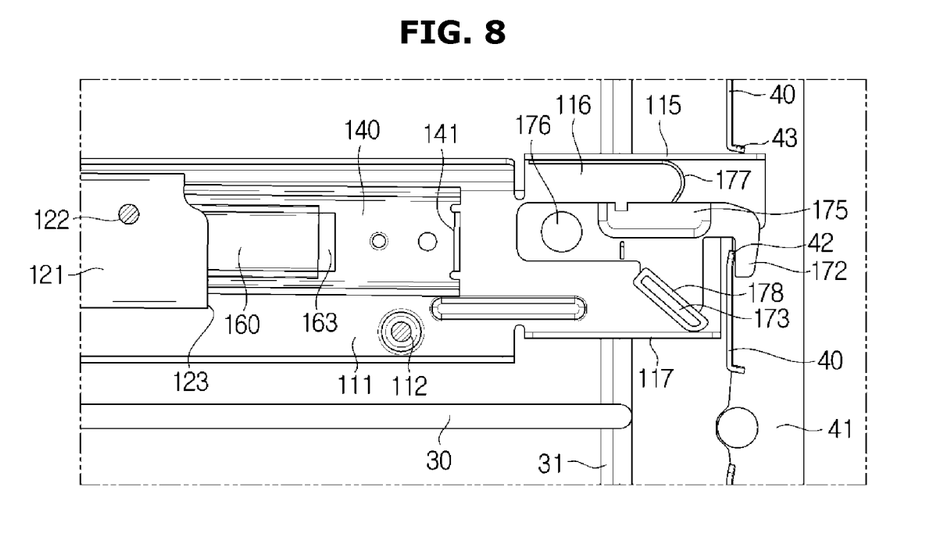
FIG. 8 shows a side view of the area A of FIG. 3.

FIG. 7 is an enlarged perspective view of an area A of FIG. 3, and FIG. 8 is a side view of the area A of FIG. 3.

Referring to FIGS. 3, 7, and 8, the stationary member 110 of the rack assembly 100 may be fixed in the inside of the cooking room 20, and at least one portion of the moving member 120 may protrude out of the cooking room 20. This state is defined as an open position of the moving member 120.

When the moving member 120 is at the open position, the locking device 170 may lock the stationary member 110. When the locking device 170 is in the locked state, the holders 40 may prevent the stationary member 110 from escaping from the cooking room 20.

When the moving member 120 is at the open position, the locking device 170 may be in the locked state, and the latch 172 of the locking device 170 may be caught by the holders 40. When the moving member 120 is at the open position, the lever 173 of the locking device 170 may be supported on the lower flange 117 of the stationary member bracket 111.

When the lever 173 of the locking device 170 is supported on the lower flange 117 of the stationary member bracket 111, the latch 172 of the locking device 172 may not contact any one of the holders 40. When the noise reducing member 178 surrounding the lever 173 contacts the lower flange 117 of the stationary member bracket 111, the latch 172 may not contact the holder 40.

When the lever 173 of the locking device 170 is supported on the lower flange 117 of the stationary member bracket 111, the noise reducing member 178 may contact the lower flange 117 of the stationary member bracket 111, thereby reducing noise generated between the lever 173 of the locking device 170 and the lower flange 117 of the stationary member bracket 111. When the noise reducing member 178 contacts the lower flange 117 of the stationary member bracket 111, the latch 172 may not contact an upper end 42 of the holder 40, and accordingly, no noise may be generated between the latch 172 and the holder 40.

When the stationary member 110 is fixed in the inside of the cooking room 20, a upper surface of the upper flange 115 of the stationary member bracket 111 may be supported on a lower end 43 of another holder 40. Accordingly, when the moving member 120 is at the open position, the stationary member bracket 111 of the stationary member 110 may be prevented from being lifted for the latch 172 to escape from the holder 40.

Figure 9:
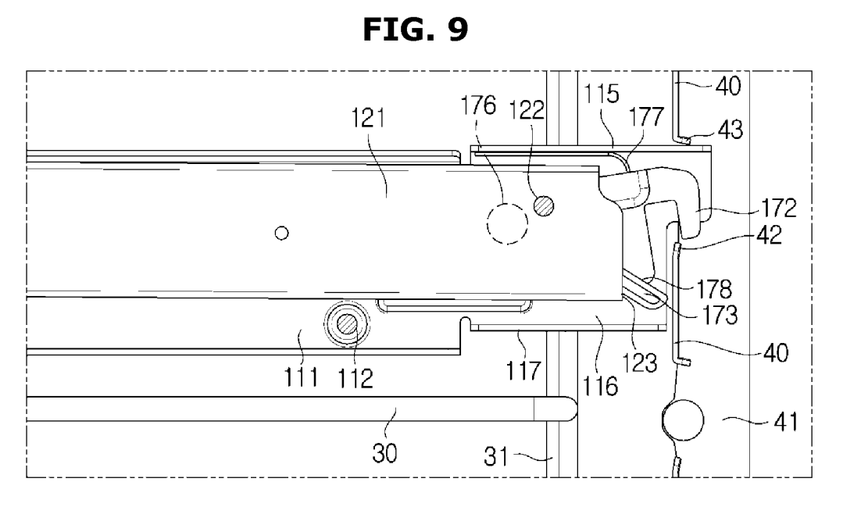
FIG. 9 shows a side view showing a state in which a moving member shown in FIG. 8 is closed.

FIG. 9 is a side view showing a state in which a moving member shown in FIG. 8 is closed.

Referring to FIG. 9, the stationary member 110 of the rack assembly 200 may be fixed in the inside of the cooking room 20, and the moving member 120 may be located in the inside of the cooking room 20. This state is defined as a close position of the moving member 120.

When the moving member 120 is at the close position, the locking device 170 may unlock the stationary member 110. When the moving member 120 is at the close position, the moving member 120 may push up the lever 173 of the locking device 170.

When the moving member 120 is at the close position, the locking device 170 may be in an unlocked state, and the latch 172 of the locking device 170 may be pushed up higher than the upper end 42 of the holder 40. When the moving member 120 is at the close position, the rear end 123 of the moving member 120 may push up the lever 173 of the locking device 170 to support the lever 173.

When the rear end 123 of the moving member 120 pushes up the lever 173 to support the lever 173, the noise reducing member 178 may contact the rear end 123 of the moving member 120, thereby reducing noise generated when the lever 173 of the locking device 170 collides or contacts with the moving member 120.

Referring to FIGS. 8 and 9, the moving member 120 may slide between the close position and the open position. The noise reducing member 178 may reduce noise generated during at least one process among the locking process of the locking device 170 and the unlocking process of the locking device 170.

When the moving member 120 moves from the close position to the open position, the noise reducing member 178 may reduce noise generated between the locking device 170 and the stationary member 110. When the moving member 120 moves from the close position to the open position, the lever 173 of the locking device 170 may collide or contact with the lower flange 117 of the stationary member bracket 111 of the stationary member 110. At this time, the noise reducing member 178 may contact the lower flange 117 of the stationary member bracket 111, thereby reducing noise generated when the lever 173 collides or contacts with the lower flange 117 of the stationary member bracket 111.

When the moving member 120 moves from the open position to the close position, the noise reducing member 178 may reduce noise generated between the locking device 150 and the moving member 120. When the moving member 120 moves from the open position to the close position, the rear end 123 of the moving member bracket 121 may collide or contact with the lever 173 of the locking device 170. At this time, the noise reducing member 178 may contact the rear end 123 of the moving member bracket 121, thereby reducing noise generated when the lever 173 collides or contacts with the rear end 123 of the moving member 120.

Figure 10:
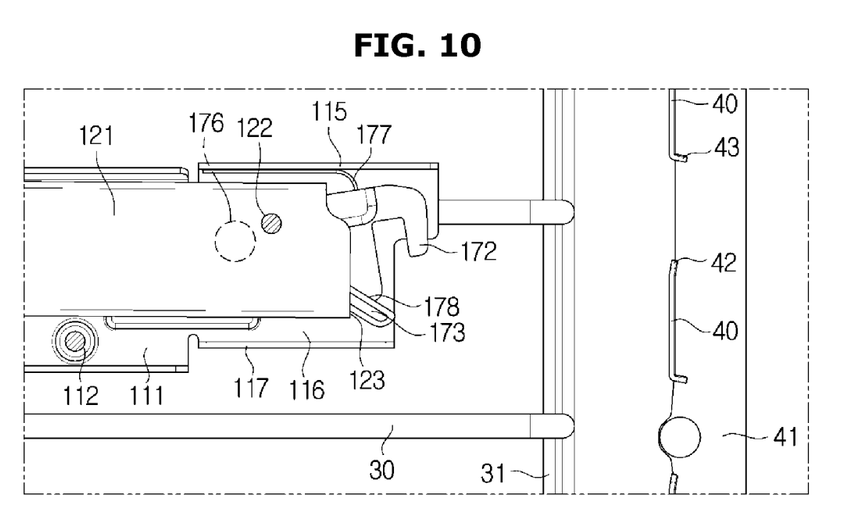
FIG. 10 shows a side view showing a state in which a rack assembly shown in FIG. 9 escapes.

FIG. 10 is a side view showing a state in which a rack assembly shown in FIG. 9 escapes.

Referring to FIG. 10, the stationary member 110 and the moving member 120 of the rack assembly 100 may escape from the holders 40. When the moving member 120 is at the close position, the locking device 170 may unlock the stationary member 110. Therefore, the user can move the moving member 120 to the close position to unlock the locking device 170, and then pull the stationary member 110 and the moving member 120 simultaneously to take the rack assembly 100 out of the cooking room 20.

According to an embodiment of the present disclosure, the noise reducing member disposed in the rack assembly can reduce noise that is generated when the moving member of the rack assembly moves from the close position to the open position or from the open position to the close position.

Also, according to an embodiment of the present disclosure, the buffer member disposed in the sliding device of the rack assembly can cushion an impact caused by a collision of the middle slide with at least one of the outer slide and the inner slide of the sliding device.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A cooking appliance comprising:
a main body including a cooking room; and
a rack assembly removably installed in an inside of the cooking room, the rack assembly comprising:
a stationary member fixed to the inside of the cooking room;
a moving member configured to slide in or out of the cooking room with respect to the stationary member, and slide between a close position at which the moving member is located in the inside of the cooking room and an open position at which at least one portion of the moving member protrudes out of the cooking room;
a locking device rotatably coupled to the stationary member, and configured to lock the stationary member when the moving member is at the open position, and unlock the stationary member when the moving member is at the close position; and
a noise reducing member installed on the locking device and configured to reduce noise that is generated when the locking device contacts with the stationary member at the open position and when the locking device contacts with the moving member at the close position.

2. The cooking appliance according to claim 1, wherein the noise reducing member reduces noise that is generated when the locking device contacts with the stationary member during a locking process of the locking device and when the locking device contacts with the moving member during an unlocking process of the locking device.

3. The cooking appliance according to claim 1, further comprising a holder configured to prevent the stationary member from escaping from the cooking room when the locking device is in a locked state, wherein the locking device comprises:
a latch configured to be caught by the holder; and a lever configured to lift the latch,
wherein the noise reducing member is disposed on the lever.

4. The cooking appliance according to claim 3, wherein the stationary member comprises a flange on which the lever is supported,
wherein the noise reducing member reduces noise that is generated when the lever contacts with the flange.

5. The cooking appliance according to claim 3, wherein the moving member pushes up the lever when the moving member is at the close position, and
wherein the noise reducing member reduces noise that is generated when the moving member contacts with the lever.

6. The cooking appliance according to claim 1, wherein the noise reducing member includes a resin material, and is injection-molded.

7. The cooking appliance according to claim 3, wherein the noise reducing member surrounds the lever.

8. The cooking appliance according to claim 4, wherein the noise reducing member includes an extension to increase a contact area contacting the flange.

9. The cooking appliance according to claim 4, wherein when the noise reducing member contacts the flange, the latch does not contact the holder.

10. The cooking appliance according to claim 1, wherein the rack assembly further comprises a sliding device configured to connect the stationary member to the moving member, and
wherein the sliding device comprises:
an outer slide coupled with the stationary member;
an inner slide coupled with the moving member; and
a middle slide coupled with the outer slide and the inner slide, and configured to slide with respect to the outer slide and the inner slide,
wherein the middle slide comprises a buffer member configured to reduce an impact caused by a contact with at least one of the outer slide and the inner slide.

11. The cooking appliance according to claim 10, wherein the middle slide has a length that is equal to or shorter than a length of the outer slide and a length of the inner slide, and
wherein the buffer member is disposed in at least one of both ends of the middle slide.

12. The cooking appliance according to claim 11, wherein the middle slide further comprises:
an outer member connected to the outer slide, and configured to slide with respect to the outer slide; and
an inner member connected to the inner slide, and configured to slide with respect to the inner slide, and
wherein the buffer member comprises a plate spring supported between the outer member and the inner member.

13. The cooking appliance according to claim 10, wherein the buffer member comprises a first buffer member configured to reduce an impact caused by a contact with the outer slide, and a second buffer member configured to cushion an impact caused by a contact with the inner slide.

14. A cooking appliance comprising:
a main body including a cooking room;
a rack assembly removably installed in an inside of the cooking room;
a rail disposed on both side walls of the cooking room, and configured to support the rack assembly; and
a holder configured to catch the rack assembly, thereby preventing the rack assembly from escaping from the cooking room,
wherein the rack assembly comprises:
a stationary member fixed to the inside of the cooking room;
a moving member configured to slide in and out of the cooking room with respect to the stationary member, and slide between a close position at which the moving member is located in the inside of the cooking room and an open position at which at least one portion of the moving member protrudes out of the cooking room;
a sliding device configured to connect the stationary member to the moving member;
a locking device rotatably coupled to the stationary member, and configured to lock the stationary member when the moving member is at the open position, and unlock the stationary member when the moving member is at the close position; a noise reducing member installed on the locking device and configured to reduce noise that is generated when the locking device contacts with the stationary member at the open position and when the locking device contacts with the moving member at the close position; and
wherein the sliding device comprises:
an outer slide coupled with the stationary member;
an inner slide coupled with the moving member; and
a middle slide coupled with the outer slide and the inner slide, and configured to slide with respect to the outer slide and the inner slide,
wherein the middle slide comprises a buffer member configured to reduce an impact caused by a contact with at least one of the outer slide and the inner slide.

15. The cooking appliance according to claim 14, wherein the locking device comprises:
a body rotatably coupled with the stationary member;
a latch extending from the body, and configured to be caught by the holder;
a lever extending from the body, and configured to be pushed by the moving member to rotate the body; and
an elastic member installed between the body and the stationary member, the elastic member having a restoring force toward a direction in which the latch is caught by the holder,
wherein the noise reducing member is disposed on the lever.

16. The cooking appliance according to claim 14, wherein the outer slide comprises a first flange configured to prevent the middle slide from escaping, and
the inner slide comprises a second flange configured to prevent the middle slide from escaping, and
wherein the buffer member comprises a plate spring disposed in at least one end of both ends of the middle slide, and configured to reduce an impact caused by a contact with at least one flange of the first flange and the second flange.

17. The cooking appliance according to claim 16, wherein the middle slide further comprises:
an outer member connected to the outer slide, and configured to slide with respect to the outer slide; and
an inner member is connected to the inner slide, and configured to slide with respect to the inner slide, and
wherein the plate spring is supported between the outer member and the inner member.

* * * * *